United States Patent
Bos et al.

(10) Patent No.: US 12,499,053 B2
(45) Date of Patent: Dec. 16, 2025

(54) APPLICATION STACK READ-ONLY REPLICA WITH APPLICATION SPECIFIC WRITE BUFFER

(71) Applicant: SAP SE, Walldorf (DE)

(72) Inventors: Daniel Bos, Beijing (CN); Peter Schoenau, Untergruppenbach (DE); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 164 days.

(21) Appl. No.: 18/441,183

(22) Filed: Feb. 14, 2024

(65) Prior Publication Data
US 2025/0258776 A1 Aug. 14, 2025

(51) Int. Cl.
*G06F 12/0888* (2016.01)
(52) U.S. Cl.
CPC ................ *G06F 12/0888* (2013.01)
(58) Field of Classification Search
None
See application file for complete search history.

(56) References Cited

U.S. PATENT DOCUMENTS

| | | | |
|---|---|---|---|
| 10,353,798 B1* | 7/2019 | Diac | G06F 8/30 |
| 11,347,549 B2* | 5/2022 | Tang | G06F 9/5061 |
| 2014/0317600 A1* | 10/2014 | Klunder | G06F 11/3672 |
| | | | 717/124 |
| 2018/0089248 A1* | 3/2018 | Guim Bernat | G06F 16/23 |
| 2022/0019485 A1* | 1/2022 | Slovetskiy | G06F 9/52 |

* cited by examiner

*Primary Examiner* — Kaushikkumar M Patel
(74) *Attorney, Agent, or Firm* — Buckley, Maschoff & Talwalkar LLC

(57) ABSTRACT

According to some embodiments, a replication tool may arrange for a copy of original records from a data source to be written into a read-only replica in an application stack. Write buffer logic in the application stack may determine that information in an original record of the read-only replica has been locally updated at the application stack by application logic. The write buffer logic may then automatically create an updated version of the original record in a write buffer of the application stack based on the local update by the application logic. Moreover, prioritization logic may automatically determine whether information in the original record or the updated record will be accessed.

21 Claims, 12 Drawing Sheets

700

RESULT

| PRIORITIZATION LOGIC | Home Address | Shipping Address |
|---|---|---|
| Always Prioritize Replica | 14 Main Street | 14 Main Street |
| Always Prioritize Write Buffer | 33 West Lane | 22 South Street |
| Prioritize Write Buffer When Active | 33 West Lane | 22 South Street |
| Prioritize Based on Last Update | 14 Main Street | 14 Main Street |
| Subset of Both | 14 Main Street | 22 South Street |

*FIG. 7*

APPLICATION STACK READ-ONLY REPLICA WITH APPLICATION SPECIFIC WRITE BUFFER

BACKGROUND

An enterprise may implement automated business flows, such as processes to handle customer orders, utilize human resource information, track financial information, etc. via a cloud computing environment. In a software application stack, many use-cases require access to data of other software components. This is typically referred to as data integration, such as via federation (e.g., an on-the-fly look up of data) or data replication (often used in frequent access and mass data scenarios). The data copied into the application stack may still logically belong to another software component (e.g., the source system). For example, a business flow (e.g., "a customer ordering a product") may require additional information such as customer data, a shipping address, billing information, etc. to complete the transaction. In a cloud computing environment, where software is highly componentized and no longer exists as a huge monolith, all of the required information might not be locally available. Instead, an application may look up the required data. There are several patterns available to do this, including the creation of a local replica of the required data-which may be appropriate when look ups are very frequent, there is some physical distance between the components, and/or the amount of data results in slow on-the-fly remote access. In such scenarios, the replicated data logically still belongs to the remote software component. If the local replica is changed by a business flow locally, it is no longer synchronized with the original data. This can be problematic especially if multiple business flows work with the same data. To prevent such inconsistencies, the replica is often made "read-only" for any local logic.

Blocking local changes (and therefore prevent a misalignment between the original data and the replica) works fine if the data is only required for lookups. When the business process is more complex and requires enriching or adjusting the data, an application specific local replica of the replica is required. Such an approach can be a time consuming and error prone process from a Total Cost of Ownership ("TCO") a Total Delivered Cost ("TDC") perspective. Each application developer needs to tackle very similar problems individually and a lot of redundancy is created which increases costs and require effort to keep the different parts in synchronization.

Systems are desired to improve the use-case of replicating data into a software application stack.

SUMMARY

According to some embodiments, methods and systems may include a replication tool that arranges for a copy of original records from a data source to be written into a read-only replica in an application stack. Write buffer logic in the application stack may determine that information in an original record of the read-only replica has been locally updated at the application stack by application logic. The write buffer logic may then automatically create an updated version of the original record in a write buffer of the application stack based on the local update by the application logic. Moreover, prioritization logic may automatically determine whether information in the original record or the updated record will be accessed.

Some embodiments comprise: means for arranging, by a replication tool, for a copy of original records from a data source to be written into a read-only replica in an application stack; means for determining, by a computer processor of write buffer logic in the application stack, that information in an original record of the read-only replica has been locally updated at the application stack by application logic; means for automatically creating an updated version of the original record in a write buffer of the application stack based on the local update by the application logic; and means for automatically determining, by prioritization logic, whether information in the original record or the updated record will be accessed.

Some technical advantages of some embodiments disclosed herein are improved systems and methods to improve the use-case of replicating data into a software application stack in an efficient and accurate manner.

BRIEF DESCRIPTION OF THE DRAWINGS

FIG. 7 illustrates prioritization results in accordance with some embodiments.

DETAILED DESCRIPTION

Briefly, some embodiments may dissolve (or at least ease) problems in a way that introduces a write enabled buffer next to the read-only replica in an automated way. In this way, an application may freely perform changes and updates, but these are made in the buffer and not the replica. During select operations, both the replica and the buffer may be joined. When there are collisions for the same record (e.g., having identical key-columns), a customizable prioritization rule may define which instance of a record is visible to the application (sometimes referred to as a "right-of-way" rule). To further strengthen the use-case and let multiple scenarios operate on the same replica data, multiple write buffers can be introduced (each with its own "right-of-way" logic), such as different buffers for different Lines of Business ("LOBs") that can change values differently.

In the following detailed description, numerous specific details are set forth to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
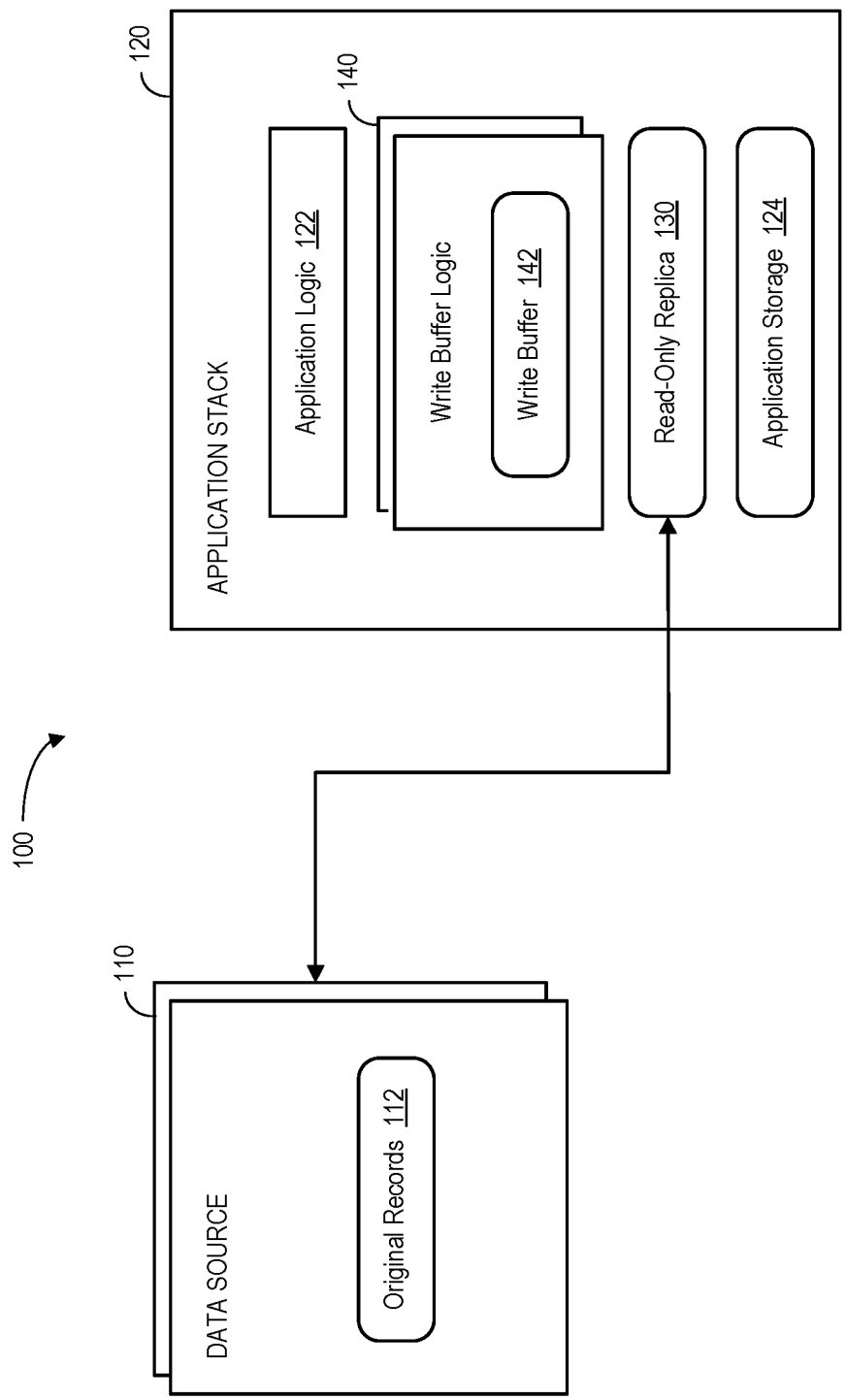
FIG. 1 is a high-level block diagram of a system including a data source and an application stack in accordance with some embodiments.

FIG. 1 is a high-level block diagram of a system 100 in accordance with some embodiments. The system 100 may be associated with, for example, Enterprise Resource Planning ("ERP") software such as SAP™ S/4 HANA®. The system 100 includes a data source 110 (with original data records 112) coupled to an application stack 120. The application stack 120 runs application logic 122 that accesses application storage 124.

Moreover, the application stack 120 includes a read-only replica 130 and write buffer logic 140 that manages a write buffer 142. According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the write buffer 142), which may be locally stored in the application stack 120. Although a single write buffer 142 is shown in FIG. 1, any number of such devices may be included. Moreover, various devices described herein might be combined according to embodiments of the present invention. For example, in some embodiments, the write buffer logic 140 and the write buffer 142 might comprise a single component or apparatus. Some or all of the system 100 functions may be performed by a constellation of networked apparatuses, such as in a distributed processing or cloud-based architecture.

An operator (e.g., a database administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various prioritization rules) and/or provide or receive automatically generated recommendations, results, and/or alerts from the system 100.

The application storage 124 may comprise the regular storage used by the application logic 122 to persist states of a business processes, to query for analysis, and anything else that the application logic 122 is required to perform. In most cases, it is a database which is part of the same application stack 120 as the application logic 122. The read-only replica 130 represents the tables used as targets to store a copy of the original records 112 in the data source 110. They might co-exist in the very same database as the application storage 124 either in a dedicated schema or in the same schema but with different names or a specific prefix. The write buffer 142 represents the tables that are used to save records from the replica 130 that have been changed locally by the application logic 122. They might also co-exist in the same database as the application storage 124. There might also be multiple instances of such a write buffer 142 support multiple consumers of the data.

Figure 2:
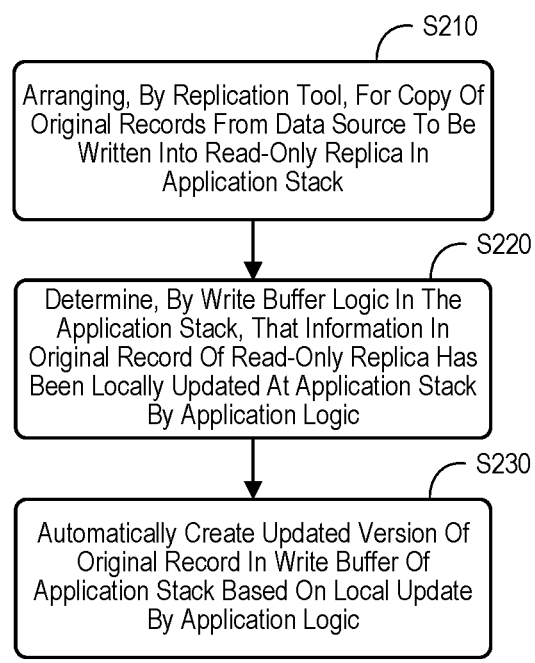
FIG. 2 is a method according to some embodiments.

FIG. 2 is a method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a replication tool may arrange for a copy of original records from a data source to be written into a read-only replica in an application stack. The replication tool might be implemented in at least one of: the data source, the application stack, stand-alone tooling, etc. At S220, a computer processor of write buffer logic (in the application stack) may determine that information in an original record of the read-only replica has been locally updated at the application stack by application logic. At S230, the system may automatically create an updated version of the original record in a write buffer of the application stack based on the local update by the application logic.

Figure 3:
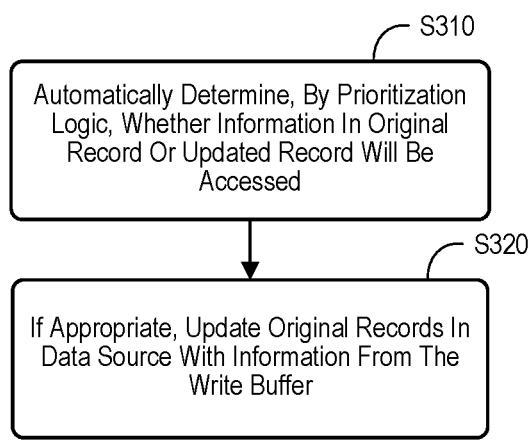
FIG. 3 is a prioritization method according to some embodiments.

According to some embodiments, prioritization logic to "right-of-way" rules may be implemented. For example, FIG. 3 is a prioritization method according to some embodiments. At S310, prioritization logic automatically determines whether information in the original record or the updated record will be accessed. The prioritization logic might, for example, always prioritize the original record in the read-only replica or the updated record in the write buffer. In some embodiments, the prioritization logic prioritizes the original record in the read-only replica and the updated record in the write buffer based on whether a process flow is still active. In other embodiments, the prioritization logic prioritizes the original record in the read-only replica and the updated record in the write buffer based on an update order (e.g., the most recently updated information might be selected). As still another example, the prioritization logic may prioritize the original record in the read-only replica and the updated record in the write buffer based on pre-defined subsets of fields. At S320, the system may update original records in data source with information from the write buffer if appropriate (e.g., after application logic is complete.

Figure 4:
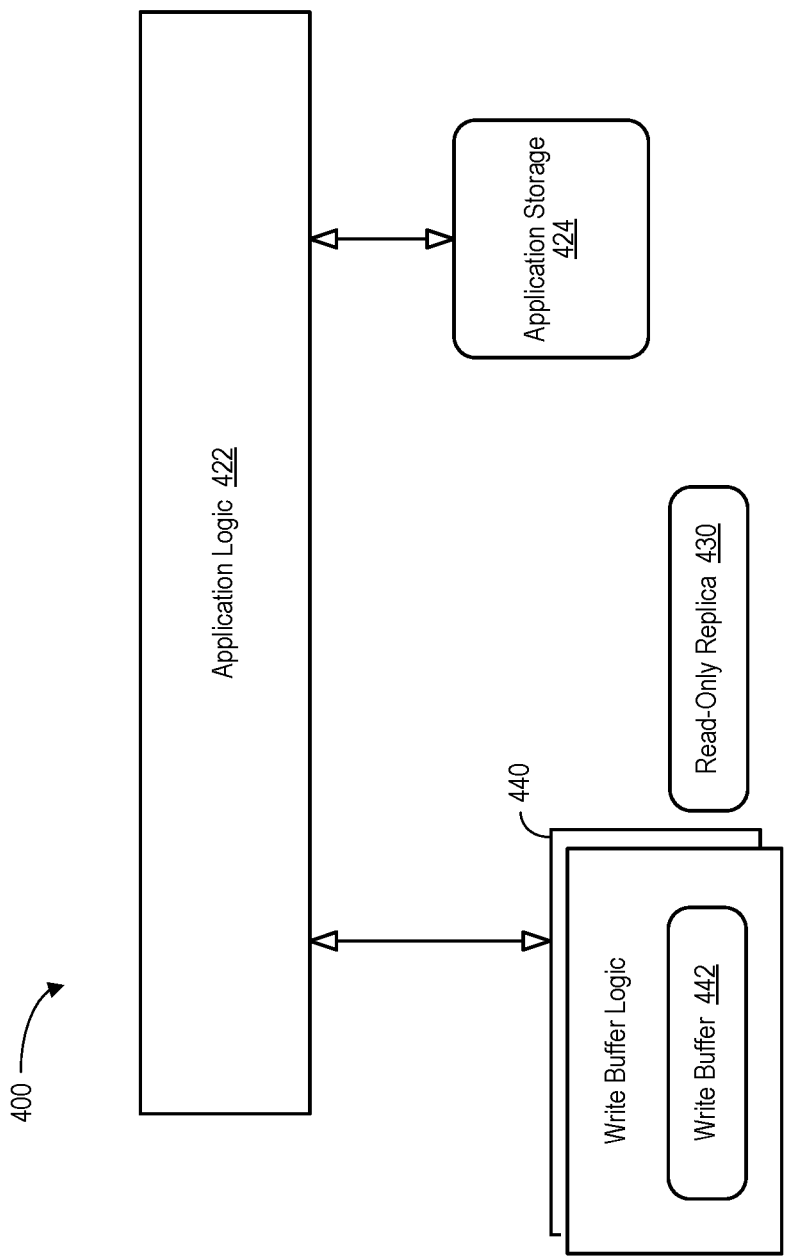
FIG. 4 is an information writing operation according to some embodiments.
Figure 5:
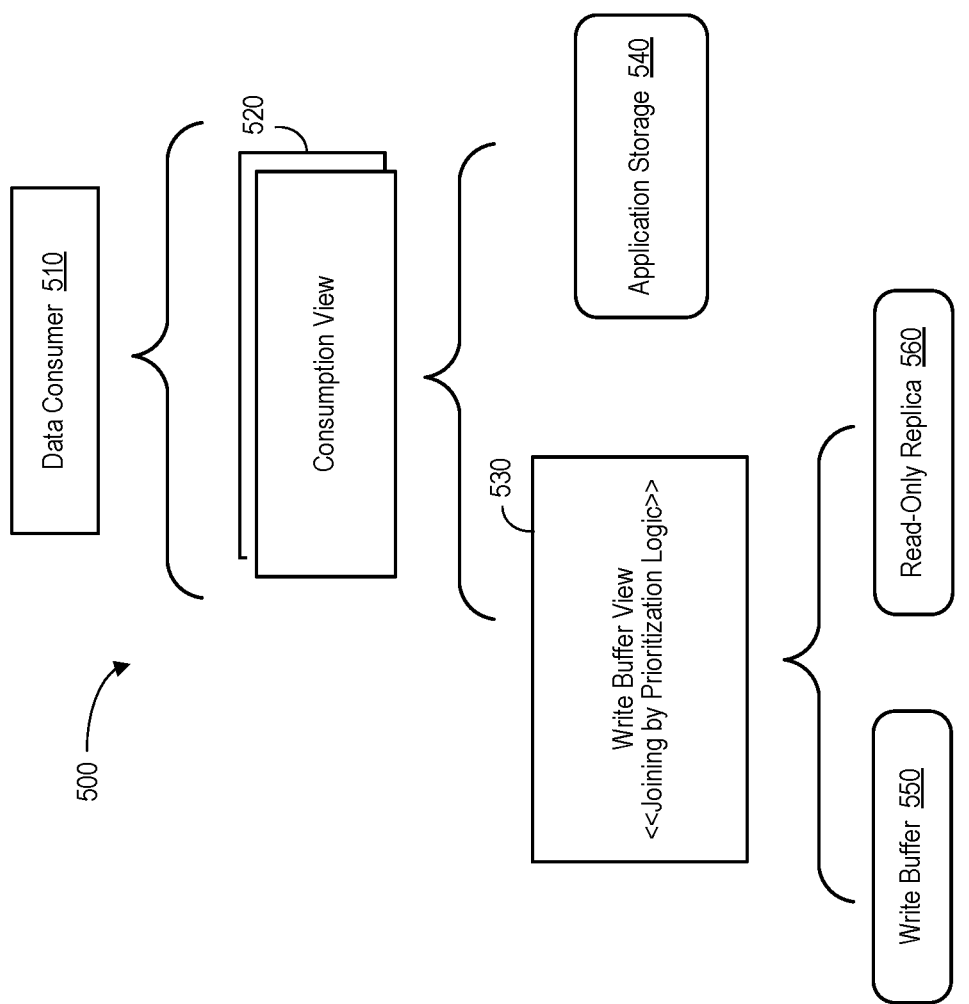
FIG. 5 is an information consumption operation in accordance with some embodiments.

FIG. 4 is an information writing operation 400 in an application stack according to some embodiments. When updating the persistency based on a business process, application logic 422 would update application storage 424 as well as a write buffer 442 in write buffer logic 440 (without updating read-only replica 430 tables). FIG. 5 is an information consumption operation 500 in an application stack in accordance with some embodiments. In this embodiment, a data consumer 510 is associated with consumption views 520. The consumption views 520 in turn are associated with a write buffer view 530 (e.g., joining by prioritization logic data from a write buffer 550 and a read-only replica 560) and application storage 540. In this way, the consumption logic within the application stack utilizes three versions of the data (the application storage 540 as well as the read-only replica 560 and the write buffer 550). Initially, a result is constructed out of the read-only replica 560 and the write buffer 550 by utilizing whatever rule is defined as the "right-of-way" logic. This result is then combined with the original application storage 540 data. When there is specific consumption logic, only one instance of the write buffer 550 may be used and is specific to the data consumer 510.

Figure 6:
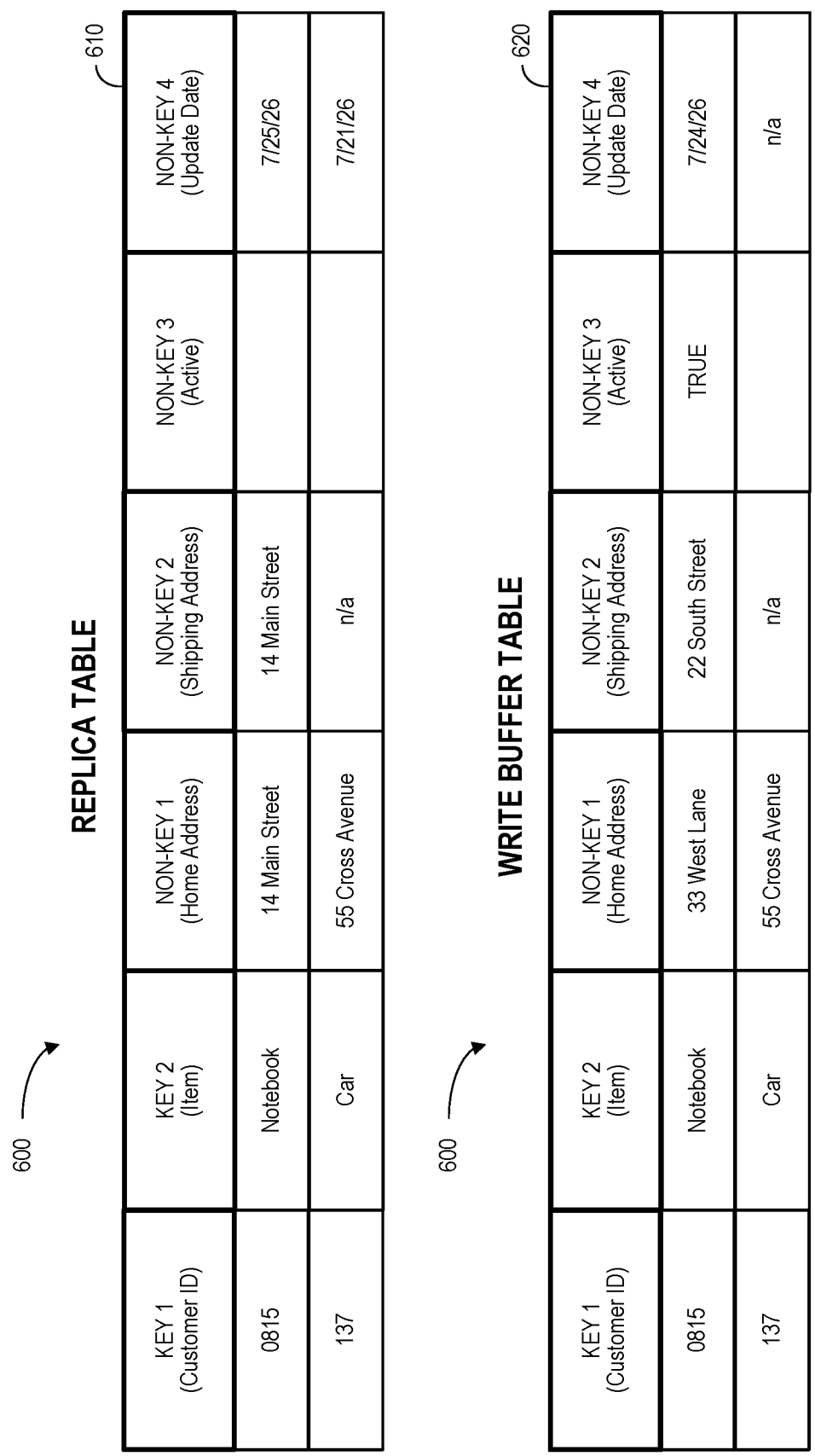
FIG. 6 illustrates record field prioritization according to some embodiments.

FIG. 6 illustrates 600 record field prioritization including a replica table 610 and a write buffer table 620 for a customer order according to some embodiments. Each table 610, 620 includes two key fields (customer identifier and item) and four non-key fields (home address, shipping address, an indication of whether a process flows is active, and an update date). The term "right-of-way" may refer to certain prioritization and customizing logic which can be configured in the system to dictate which data is prioritized when the same key combination exists within the replica table 610 and write buffer table 620 as well as the write buffer.

Examples of customizing could include prioritizing the replica table 610 or the write buffer table 620 for all fields. As another example, the system might prioritize the write buffer table 620 when a process flow is still active (e.g., the notebook order for customer identifier "0815"). Other examples might be based on the most recent update (e.g., based on the update date) or take a subset of fields from both the replica table 610 and the write buffer table 620 (e.g., always use the home address from the replica table 610 and the shipping address from the write buffer table 620).

A query to get all order items (or specific order items) of a customer may create different result sets depending on the "right-of-way" logic:

SELECT <home address>, <shipping address>
FROM <write buffer-view>
WHERE <customer-id>="0815"

FIG. 7 illustrates prioritization results 700 for such a query in accordance with various prioritization or right-of-way rules in accordance with some embodiments. When the prioritization logic always prioritizes the replica, the home address and shipping address are both taken from the replica table 610. When the prioritization logic always prioritizes the write buffer, the home address and shipping address are both taken from the write buffer table 620. When the prioritization logic prioritizes the write buffer if it is active, the information is taken from the write buffer table 620 for customer identifier "0815" (based on the non-key 3 field). When the prioritization logic prioritizes the most recently updated information, the information is taken from the replica table 610 (because Jul. 25, 2026 is more recent than Jul. 24, 2026). When the prioritization logic prioritizes subsets of fields from both the replica and the write buffer, the home address might be taken from the replica table 610 while the shipping address is taken from the write buffer 620. In this results 700 of FIG. 7, the "subset" is configured to take the home address from the replica table 610 and the shipping address from the write buffer table 620. Conceptually, this makes only specific fields "writable" as any changes to other fields are effectively ignored while reading the data.

Figure 8:
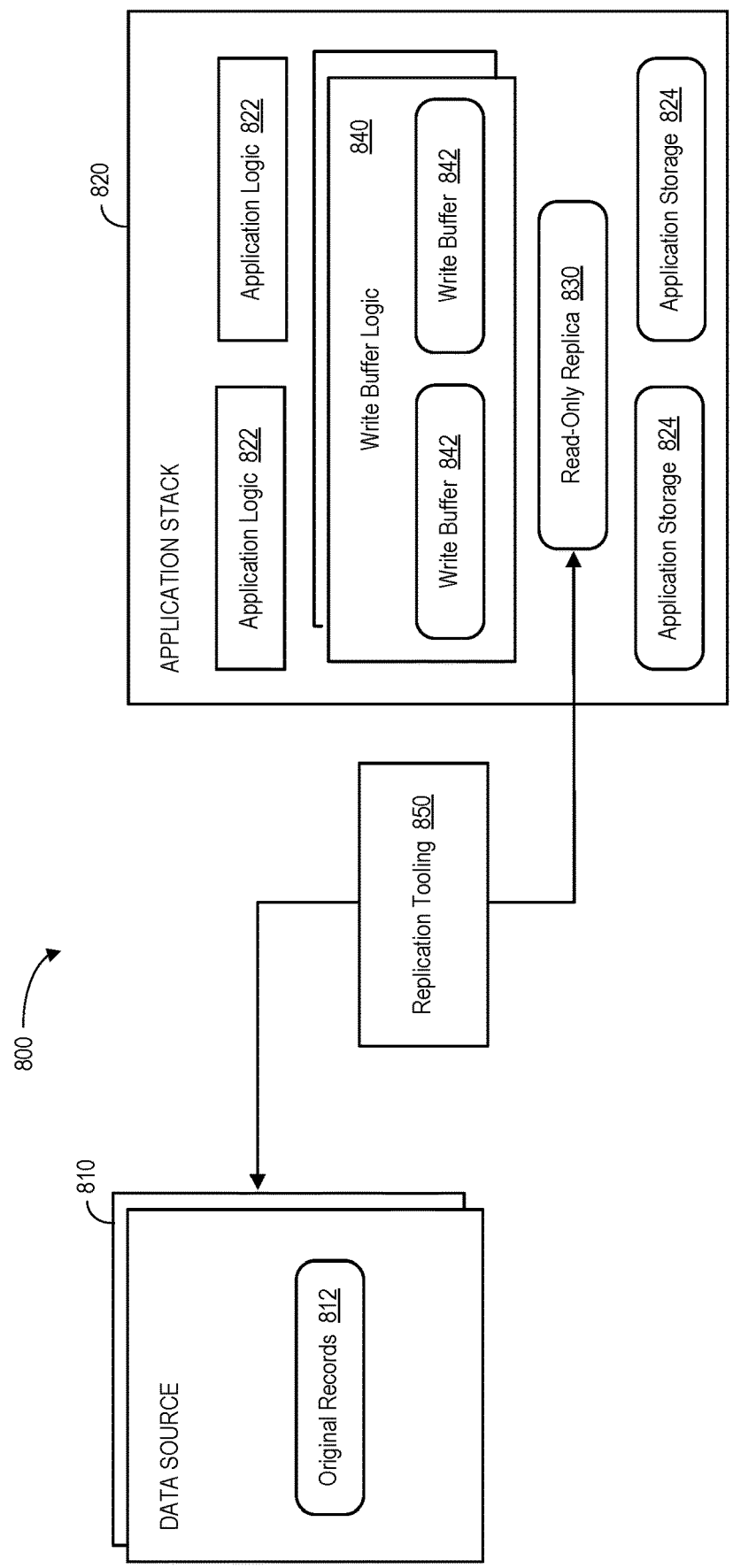
FIG. 8 is another high-level block diagram of a system according to some embodiments.

FIG. 8 is another high-level block diagram of a system 800 according to some embodiments. As before, the system 800 includes a data source 810 (with original data records 812) coupled to an application stack 820. The application stack 820 runs multiple application logic 822 that each accesses its own application storage 824. Moreover, the application stack 820 includes a read-only replica 830 and multiple write buffer logic 840 that each manages its own write buffer 842.

In some embodiments, replication tooling 850 connects to the data source 810 and writing data (insert/update/delete) into the read-only replica 830 of the application stack 820. The replication tooling 850 does not write into either the application storage 824 or the write buffers 842. While the replication tooling 850 is illustrated as a dedicated system in the middle (of the 3-tier implementation), in other embodiments the logic could also be part of the data source 810 or the application stack 820. The multiple write buffers 842 may be associated with a single original record 812 copied into the read-only replica 830. Note that different write buffers 842 might be associated with different applications in the application stack 820. Moreover, different write buffers 842 might be associated with different prioritization or right-of-way logic.

Figure 9:
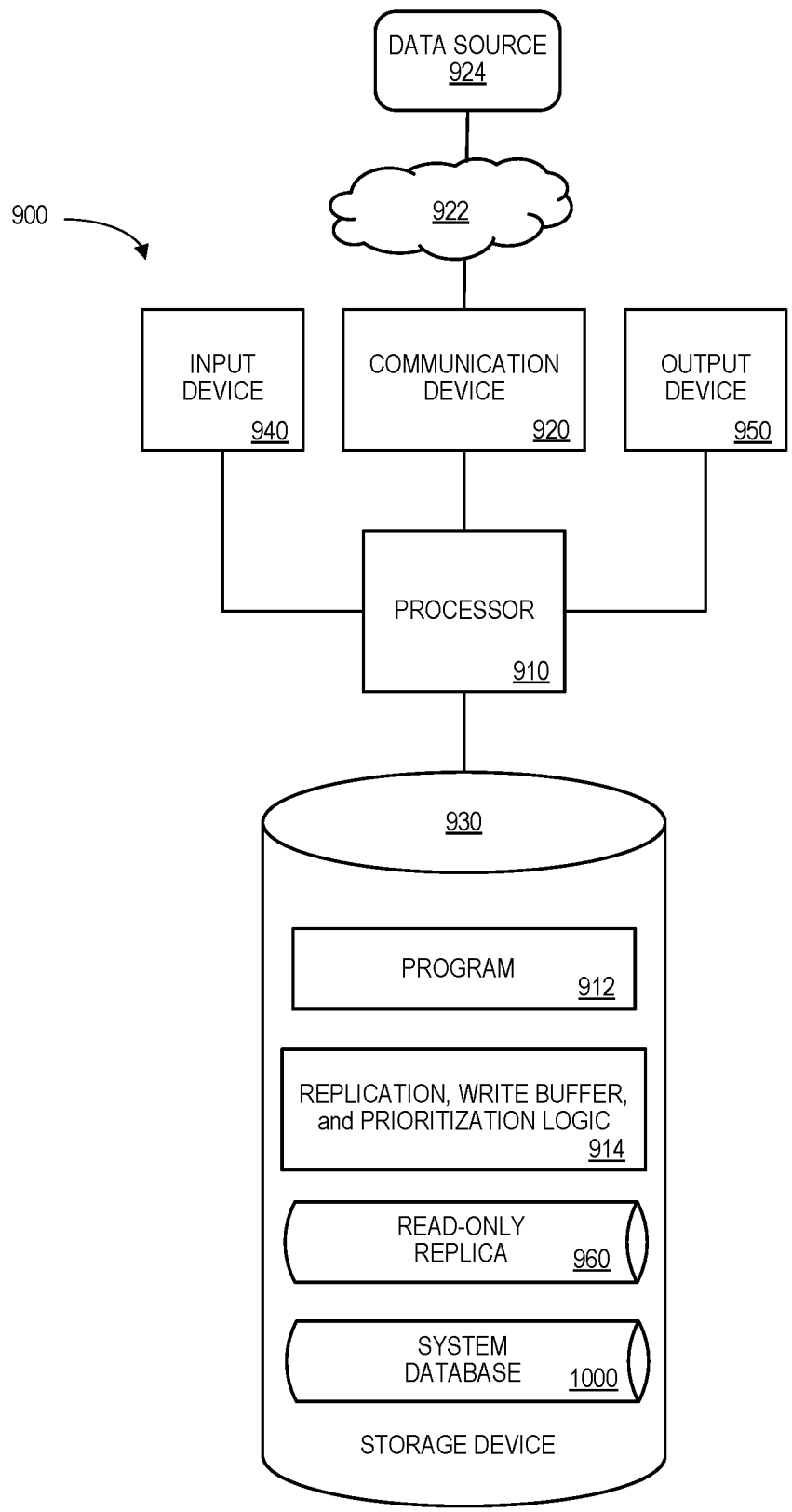
FIG. 9 is an apparatus in accordance with some embodiments.

Note that the embodiments described herein may be implemented using any number of different hardware configurations. For example, FIG. 9 is a block diagram of an apparatus or platform 900 that may be, for example, associated with the systems 100, 800 of FIGS. 1 and 8, respectively (and/or any other system described herein). The platform 900 comprises a processor 910, such as one or more commercially available CPUs in the form of one-chip microprocessors, coupled to a communication device 920 configured to communicate via a communication network 922. The communication device 920 may be used to communicate, for example, with one or more data sources 924 via the communication network 922. The platform 900 further includes an input device 940 (e.g., a computer mouse and/or keyboard to input data about right-of-way logic) and an output device 950 (e.g., a computer monitor to render a display, transmit recommendations or alerts, and/or create monitoring reports). According to some embodiments, a mobile device and/or PC may be used to exchange data with the platform 900.

The processor 910 also communicates with a storage device 930. The storage device 930 can be implemented as a single database, or the different components of the storage device 930 can be distributed using multiple databases (that is, different deployment data storage options are possible). The storage device 930 may comprise any appropriate data storage device, including combinations of magnetic storage devices (e.g., a hard disk drive), optical storage devices, mobile telephones, and/or semiconductor memory devices. The storage device 930 stores a program 912 and/or replication, write buffer, and prioritization logic 914 for controlling the processor 910. The processor 910 performs instructions of the programs 912, 914, and thereby operates in accordance with any of the embodiments described herein. For example, the processor 910 may arrange for a copy of original records from a data source to be written into a read-only replica 960 in an application stack. Write buffer logic in the application stack executed by the processor 910 may determine that information in an original record of the read-only replica has been locally updated at the application stack by application logic. The write buffer logic may then automatically create an updated version of the original record in a write buffer of the application stack based on the local update by the application logic. Moreover, prioritization logic executed by the processor 910 may automatically determine whether information in the original record or the updated record will be accessed.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, data may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores a system database 1000. An example of a database that may be used in connection with the platform 900 will now be described in detail with respect to FIG. 10. Note that the database described herein is only one example, and additional and/or different data may be stored therein. Moreover, various databases or data stores may be split or combined in accordance with any of the embodiments described herein.

Figure 10:
FIG. 10 is a portion of a tabular system database according to some embodiments.

Referring to FIG. 10, a table is shown that represents the system database 1000 that may be stored at the platform 900 according to some embodiments. The system database 1000 may include, for example, entries identifying different business applications or processes. The system database 1000 may also define fields 1002, 1004, 1006, 1008 for each of the entries. The fields 1002, 1004, 1006, 1008 may, according to some embodiments, specify: a source identifier 1002, an application identifier 1004, prioritization logic 1006, and a result table 1008. The system database 1000 may be created and updated, for example, when a new type of application is added, results are collected and/or updated, etc.

The source identifier 1002 may comprise, for example, a unique alphanumeric label or link that is associated with a particular data source (e.g., that maintains original data records). The application identifier 1004 might be associated with a business process executing in the application stack. The prioritization logic 1006 might define right-of-way rules that select fields from a read-only replica or a write buffer. The result table 1008 includes the information created when the prioritization logic 1006 is execute.

Figure 11:
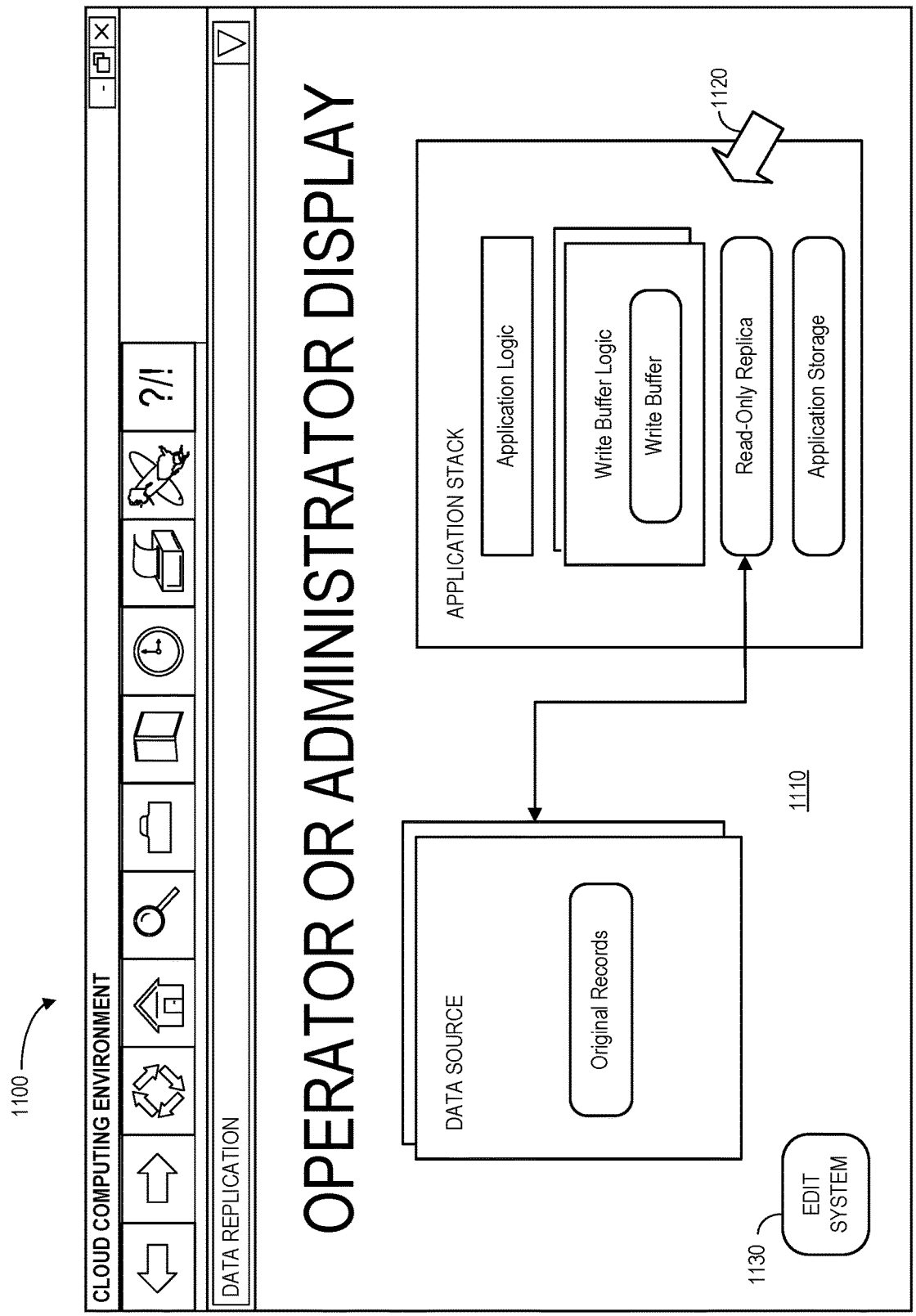
FIG. 11 is an example of an operator or administrator display according to some embodiments.

FIG. 11 is an example of an operator or administrator display 1100 according to some embodiments. The display 1100 includes a graphical representation 1110 or dashboard that might be used to manage or monitor data replication (e.g., associated with execution in an application stack). In particular, selection of an element (e.g., via a touchscreen or computer mouse pointer 1120) might result in the display of a popup window that contains configuration data. The display 1100 may also include a user selectable "Edit System" icon 1130 to request system changes (e.g., to investigate or improve data replication rules or logic, to change a data source or application mapping parameter, etc.).

Thus, embodiments may improve the use-case of replicating data into a software application stack.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications with modifications and alterations limited only by the spirit and scope of the appended claims.

Figure 12:
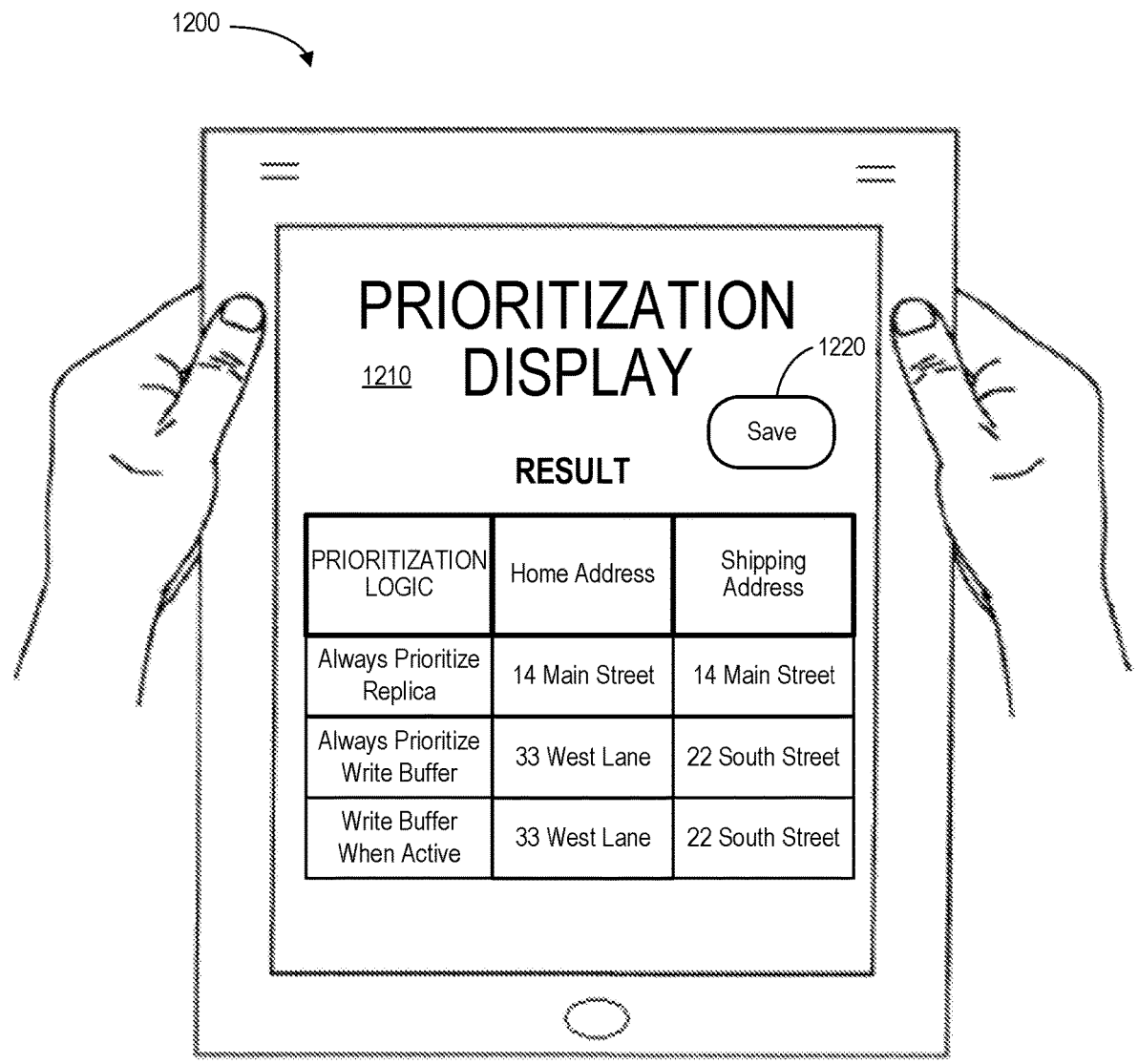
FIG. 12 is a tablet computer showing a prioritization display in accordance with some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of prioritization rules, any of the embodiments described herein could be applied to other types of rules. Moreover, the displays shown herein are provided only as examples, and any other type of user interface could be implemented. For example, FIG. 12 shows a handheld tablet computer 1200 rendering a prioritization display 1210 that may be used to help a user establish right-of-way rules or results (e.g., setting prioritization settings via a "Save" icon 1220).

What is claimed is:

1. A system, comprising:
a replication tool to arrange for a copy of original records from a data source to be written into a read-only replica in an application stack; and
write buffer logic in the application stack, including:
a computer processor, and
a computer memory coupled to the computer processor and storing instructions that, when executed by the computer processor, cause the write buffer logic to:
determine that information in an original record of the read-only replica has been locally updated at the application stack by application logic, and
automatically create an updated version of the original record in a write buffer of the application stack based on the local update by the application logic.

2. The system of claim 1, wherein the replication tool is implemented in at least one of: (i) the data source, (ii) the application stack, and (iii) stand-alone tooling.

3. The system of claim 1, further comprising:
prioritization logic to automatically determine whether information in the original record or the updated record will be accessed.

4. The system of claim 3, wherein the prioritization logic always prioritizes one of: (i) the original record in the read-only replica, and (ii) the updated record in the write buffer.

5. The system of claim 3, wherein the prioritization logic prioritizes the original record in the read-only replica and the updated record in the write buffer based on whether a process flow is still active.

6. The system of claim 3, wherein the prioritization logic prioritizes the original record in the read-only replica and the updated record in the write buffer based on an update order.

7. The system of claim 3, wherein the prioritization logic prioritizes the original record in the read-only replica and the updated record in the write buffer based on based on pre-defined subsets of fields.

8. The system of claim 3, wherein multiple write buffers are associated with a single original record in the read-only replica.

9. The system of claim 8, wherein different write buffers are associated with different applications in the application stack.

10. The system of claim 9, wherein different write buffers are associated with different prioritization logic.

11. A method, comprising:
arranging, by a replication tool, for a copy of original records from a data source to be written into a read-only replica in an application stack;
determining, by a computer processor of write buffer logic in the application stack, that information in an original record of the read-only replica has been locally updated at the application stack by application logic; and
automatically creating an updated version of the original record in a write buffer of the application stack based on the local update by the application logic.

12. The method of claim 11, wherein the replication tool is implemented in at least one of: (i) the data source, (ii) the application stack, and (iii) stand-alone tooling.

13. The method of claim 11, further comprising:
automatically determining, by prioritization logic, whether information in the original record or the updated record will be accessed.

14. The method of claim 13, wherein the prioritization logic always prioritizes one of: (i) the original record in the read-only replica, and (ii) the updated record in the write buffer.

15. The method of claim 13, wherein the prioritization logic prioritizes the original record in the read-only replica and the updated record in the write buffer based on whether a process flow is still active.

16. The method of claim 13, wherein the prioritization logic prioritizes the original record in the read-only replica and the updated record in the write buffer based on an update order.

17. The method of claim 13, wherein the prioritization logic prioritizes the original record in the read-only replica and the updated record in the write buffer based on based on pre-defined subsets of fields.

18. A non-transitory, machine-readable medium comprising instructions thereon that, when executed by a processor, cause the processor to execute operations to perform a method, the method comprising:
arranging, by a replication tool, for a copy of original records from a data source to be written into a read-only replica in an application stack;
determining, by a computer processor of write buffer logic in the application stack, that information in an original record of the read-only replica has been locally updated at the application stack by application logic;
automatically creating an updated version of the original record in a write buffer of the application stack based on the local update by the application logic; and
automatically determining, by prioritization logic, whether information in the original record or the updated record will be accessed.

19. The medium of claim 18, wherein multiple write buffers are associated with a single original record in the read-only replica.

20. The medium of claim 19, wherein different write buffers are associated with different applications in the application stack.

21. The medium of claim 20, wherein different write buffers are associated with different prioritization logic.

* * * * *